United States Patent
Lassiter

[11] Patent Number: 6,158,095
[45] Date of Patent: Dec. 12, 2000

[54] POWER CORD CLIP

[76] Inventor: Jerry Lassiter, 6939 Schoepf Dr., Northfield, Ohio 44067

[21] Appl. No.: 09/110,050

[22] Filed: Jul. 2, 1998

[51] Int. Cl.[7] ....................................... F16L 3/02
[52] U.S. Cl. ........................ 24/339; 24/129 R; 248/74.2; 403/396
[58] Field of Search ................. 24/339, 129 R, 24/115 A, 132 R, 133, 127, 122.6, 115 R; 248/229.16, 229.26, 68.1, 74.2, 231.81; 403/389, 391, 396, 398

[56] References Cited

U.S. PATENT DOCUMENTS

| 978,396 | 12/1910 | Rischard | 24/339 |
|---|---|---|---|
| 1,216,531 | 2/1917 | Wolf | 24/339 X |
| 1,816,301 | 7/1931 | Sundell | 24/339 |
| 2,452,406 | 10/1948 | Volkery et al. | 403/391 |
| 2,696,963 | 12/1954 | Shepherd . | |
| 2,723,431 | 11/1955 | Di Renzo | 24/339 X |
| 3,090,826 | 5/1963 | Cochran . | |
| 3,096,551 | 7/1963 | Shoberg . | |
| 3,521,332 | 7/1970 | Kramer | 403/391 |
| 3,848,839 | 11/1974 | Tillman | 248/74.2 |
| 4,707,906 | 11/1987 | Posey . | |
| 5,309,604 | 5/1994 | Poulsen . | |
| 5,388,802 | 2/1995 | Dougan et al. | 248/74.2 |
| 5,441,224 | 8/1995 | Ludwig | 248/68.1 X |
| 5,542,209 | 8/1996 | Sheu | 24/339 X |
| 5,632,552 | 5/1997 | Wang et al. | 362/369 |
| 5,769,556 | 6/1998 | Colley | 403/396 X |
| 5,784,762 | 7/1998 | Huntting | 24/129 R |

Primary Examiner—Robert J. Sandy

[57] ABSTRACT

A clip for retaining power or extension cords for transport and to prevent damage to the cord. The cord has two sleeves that are created when an upper and a lower member are fastened together or formed in a body member. One sleeve is closed and the other has an opening for the insertion of a power cord. A lever is attached at the top of the clip to aid in the opening of the open end of the clip for the insertion of a cord. Within the closed sleeve is a retaining mechanism that aids in the retention and positioning of a power cord. Integrally molded within the open sleeve may be ribs that increase the frictional engagement between the clip and the cord. The clip can be constructed in one or two pieces and can be used with a variety of different tools and applications.

20 Claims, 2 Drawing Sheets

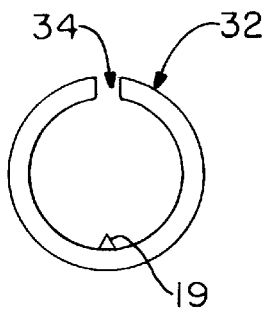
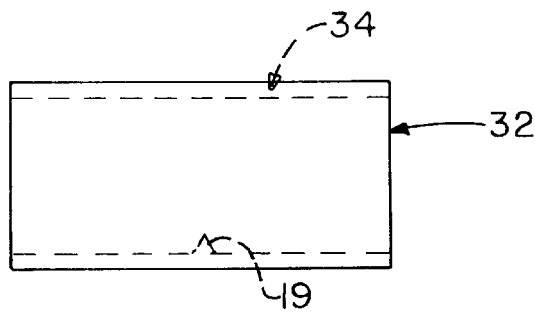
FIG.-4  FIG.-5
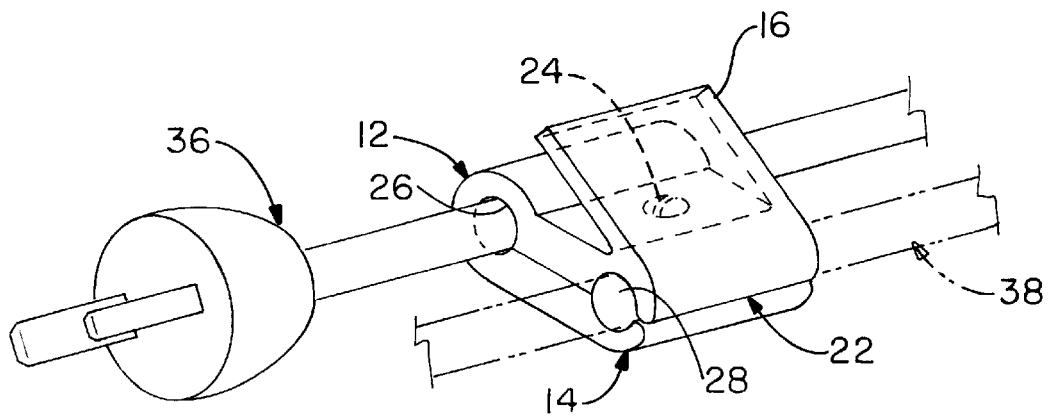
FIG.-6
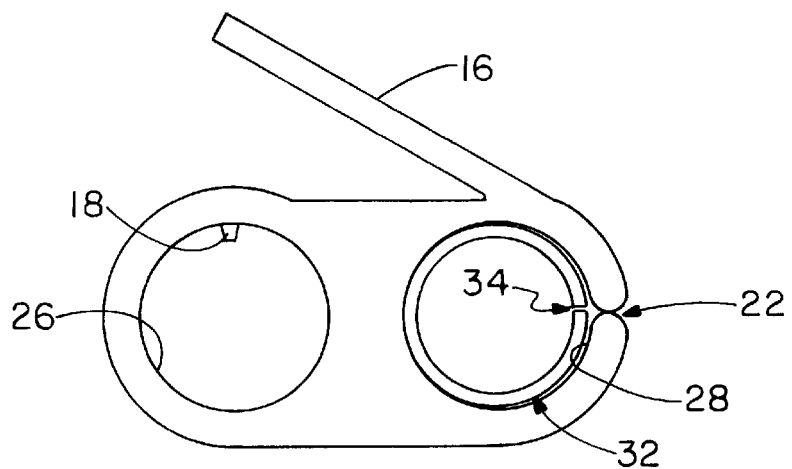
FIG.-7

POWER CORD CLIP

FIELD OF THE INVENTION

The invention relates generally to a device for retaining an electric power cord in a desired position and particularly to a flexible clip that clamps onto the power cord to hold it in place.

BACKGROUND OF THE INVENTION

Electric power cords and extension cords have many uses in peoples everyday life from plugging in a string of lights at Christmas time to using heavy duty power equipment on construction projects. When one is done using power equipment it is often desirous to wrap the power cord around the tool for transport. In doing this, connecting the end of the power cord to another place on the cord for retention is necessary. However, most cords are not equipped with a mechanism for connecting the plug end to another place on the cord. Thus, the cord is pulled into a knot in order to retain the end of the cord. This is detrimental to the life of both the cord itself and the connection between the cord and the attached plug. Further, when connecting two extension cords together, the two cords are often tied together to prevent the connection between the two cords from coming apart and cutting the electricity to the tool. Several devices have been developed in order to assist with this problem, however prior art devices do not accomplish all the desired functions and flexibility to secure the ends of power and extension cords.

SUMMARY OF THE INVENTION

The present invention is a clamp consisting of an upper and lower member, with a lever integrally associated with the upper member which may be formed with a "living" hinge. The upper and lower members can be attached by a suitable fastening arrangement. Optionally, the upper and lower members can be molded in one piece, eliminating the need for any fastening system. The power cord clip has two sleeves, with one open and one closed. The sleeves are formed upon securing the members together, with the open sleeve having an opening opposite the closed sleeve and relative to the lever to allow the opening to be widened upon actuation of the lever so that a power or extension cord can be placed within the open end of the clip. Within the closed sleeve of the clip, there may be a retaining member that keeps the power or extension cord in place when it is being retained by the clip. The retaining member seats into the covering and insulation of the cord in a manner that the cord is retained in the cord clip without damaging the cord while it is being retained. The open sleeve of the clip may have a retention rib on the upper and lower members. These ribs serve to add to the frictional engagement of the cord clip on the cord. In order to hold a power or extension cord, the closed sleeve is positioned around a portion of the cord. Such as by separating the upper and lower members of the cord clip. The open sleeve is then biased to a cord receiving position, and a portion of the cord, or the other end of the cord is then placed into the open sleeve of the clip through the opening or slit in the open sleeve and is retained therein. If the one piece cord clip is used, the clip is slid onto the cord before the cord is attached to the tool. If the diameter of the cord is too small to be retained by the cord, an insert can be placed on the cord to allow the cord clip to grasp the cord.

It is therefore an object of the present invention to provide a power cord clip that can be used with power cords and extension cords to retain them in position and prevent damage to the cord.

This and other objects and advantages of the invention, as well as the details of illustrative embodiments, will be more fully understood from the following specification and drawings.

BRIEF DESCRIPTION OF THE DRAWINGS

FIG. 4 is side view of the insert of the present invention.

FIG. 5 is a side elevational view of the insert of the present invention.

FIG. 6 is a side elevational view of the cord clip of the present invention.

FIG. 7 is a side elevational view of the cord clip of the present invention having the optional tubular insert placed within its open sleeve.

DETAILED DESCRIPTION OF THE PREFERRED EMBODIMENT

Reference will now be made in detail to the present preferred embodiments of the present invention, examples of which are illustrated in the accompanying drawings. Whenever possible, the same reference numbers will be used throughout the drawings to refer to the same or like parts.

Figure 1:
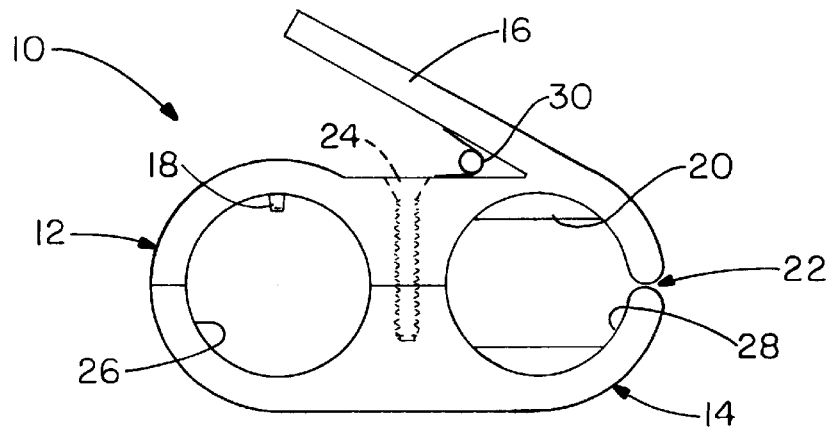
FIG. 1 is a side view of the preferred embodiment of the present invention.

Now referring to FIG. 1, a power cord clip in accordance with a first embodiment of the, present invention is shown generally at 10, and is comprised of an upper member 12 and a lower member 14 which may be clasped together by screw(s) 24 or some other suitable fastening system. For example, as the clip 10 may be molded from a plastic material, the fastening system may be molded right into the members 12 and 14, such as using a retaining clip and slot that snap fits together or another suitable arrangement. Each member 12 and 14 may be constructed of a suitable plastic or other material, and it is preferred such material be of high strength and yet has resiliency to allow movement of portions thereof for securing power cords in the clip 10. Integrally attached to the upper member 12 is a flange or actuating lever 16. When the upper member 12 and lower member 14 are secured together by screw(s) 24, two cord holding sleeves are created. At the back of the cord clip 10 is a closed sleeve 26. At the front of the clip 10 is created an open sleeve 28. Within the closed sleeve 26 is a retaining member or projecting boss 18 that is used to help retain a power or extension cord in a fixed position with respect to the clip. The retaining member 18 may be integrally molded into a portion of the closed sleeve 26 of the clip 10. Optionally, retaining member 18 can be formed as a plurality of teeth integrally molded within closed sleeve 26. The retaining member 18 is constructed in a manner that member 18 bites into and frictionally engages the covering of the electric cord but does not cut or damage the covering or insulation of the cord in any way. The resiliency of the material from which clip 10 is constructed also facilitates this action. The retaining member 18 prevents the power or extension cord from rotating within or slipping through the closed sleeve 26. Optionally, more than one retaining member 18 could be molded into the closed sleeve to further aid in retention of the cord in the closed sleeve.

At the other side of the cord clip 10 is an open sleeve 28 with an opening 22 on one side of the open sleeve. Integrally molded within the open sleeve 28 are retention members or ribs 20. Optionally a plurality of teeth can be formed integrally within open sleeve 28 to form retention members 20. The retention members 20 assist in retaining the temporarily held portion of a power cord in place while the cord is being held by the open sleeve 28 of the clip 10. Operating lever 16 may be integrally molded into the upper member 12 of the cord clip 10 and is selectively depressed by the user to selectively open opening 22. Depression of lever 16 increases the size of opening 22 to allow a power cord to be selectively inserted into sleeve 28 and secured in position as desired. Between lever 16 and top of the upper member 12, a pivot or biasing member 30 is placed to aid in closure of the opening 22 of the open sleeve 28 upon release of lever 16 by the user. The biasing member 30 may be a spring or other suitable member positioned to exert force against the lever 16 to normally bias opening 22 to a substantially closed position.

Figure 2:
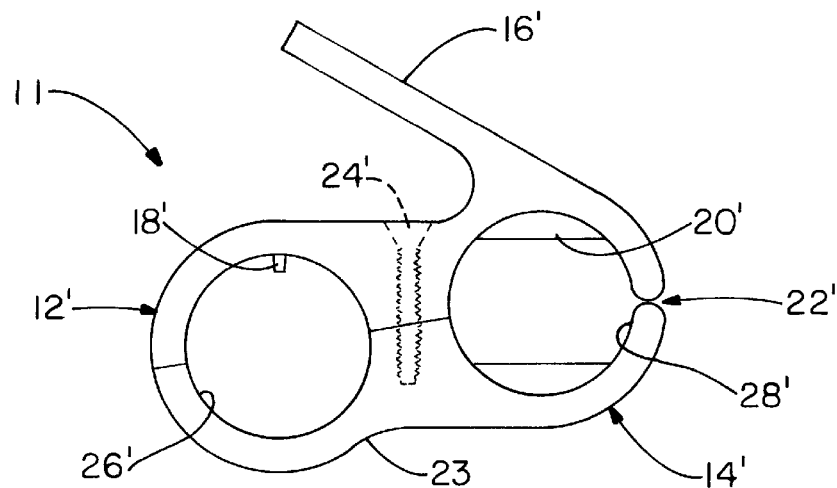
FIG. 2 is a side view of a second embodiment of the present invention

Now referring to FIG. 2, another preferred embodiment of the present invention is shown generally at 11. This embodiment may again comprise an upper member 12' and a lower member 14' which are held together by screw(s) 24' or other fastening system. Securing the upper member 12' and lower member 14' together again forms a closed sleeve 26 and an open sleeve 28. Within the closed sleeve may again be provided a retaining member 18' which aids in the retention of a power or extension cord as described above. Associated with the open sleeve 28' is an opening 22' that allows a power or extension cord to be inserted into the clip 11 and retained in position as described. The member 12' includes an integral lever 16' forming a "living" hinge which allows opening 22' to be widened for insertion of a cord and then returns to its original position wherein opening 22' is substantially closed. Retaining members 20' are integrally molded within the open sleeve 28' for better frictional engagement between the clip 11 and a power cord inserted therein. In this embodiment, the shape of the members 12' and 14' and the subsequent arrangement of closed sleeve 26' and the open sleeve 28' are offset to allow for better grasping of the flange and therefore making it easier to insert a cord through the opening 22' into the open sleeve 28'. The offset nature of the sleeves 26' and 28' further provide significant leverage advantages which simplify operation of the lever 16' while fully opening sleeve 28" for insertion of a cord. The lower member 14" may also have a configuration such that a depression or groove 23' is formed to facilitate grasping by the hand of a user. This configuration also moves the pivot point of lever 16" back toward the closed sleeve 26' to facilitate increasing the size of the opening 22" upon depression of lever 16'.

Figure 3:
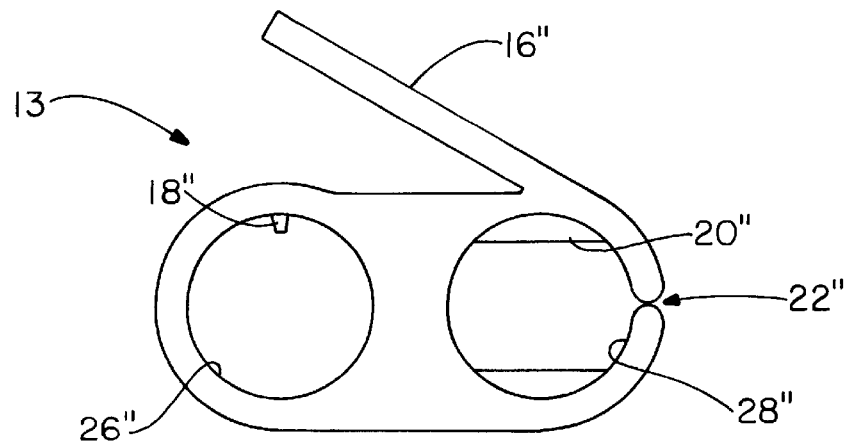
FIG. 3 is a side view of a third embodiment of the present invention.

Now referring to FIG. 3, a further alternative embodiment of the present invention is shown. A one piece power cord clip is shown generally at 13. In this embodiment the cord clip 13 is molded in a one piece configuration, in order that the cord clip 13 could not be removed from the cord after being placed onto the cord. To place the cord clip 13 around the cord, the clip 13 would be placed onto the cord before the open wire end is connected to an electric power tool such as a drill or a saw. This embodiment is comprised of a closed sleeve 26", and open sleeve 28" with an opening 22" somewhere along the circumference of the open sleeve 28", and a lever 16" which is integrally attached to the cord clip 10 adjacent to the open sleeve 28. The lever 16" and the top of the cord clip 13 is a pivot member 30". The pivot member 30" can be a solid piece of material integrally molded with the clip 13 or a spring that is placed between the lever 16" and the top of the clip 13 and held in place there by the forces exerted by the spring on the lever and the top of the clip 13. Within the closed sleeve 26" is a retaining member 18" which is integrally attached to the open sleeve and assists in the positioning and the retention of a power cord that has been placed into the closed sleeve 26". Integrally attached within the open sleeve are ribs 20" along the top and bottom of the circumference of the open sleeve 28". Ribs 20" increase the surface contact that the open sleeve 28" has with the cord and therefore aids in the retention of cord within the cord clip 13.

FIGS. 4, 5 and 7 show an insert that may be used within the closed sleeve 26 or open sleeve 28 of all the embodiments of power cord clip of the present invention. The insert 32 has an opening 34 in its circumference that allows for the insertion of a power cord within the insert 32 and also serves to slide into the retaining member 18 within the closed sleeve 26. The insert 32 is used when a smaller gauge and therefore smaller diameter power or extension cord is to be retained by the power cord clip. Integrally within the insert 32 is a retaining member 19 that aids in the positioning and retention of the power cord in the insert 32.

FIG. 6 shows the power cord clip of the present invention in use in connecting two power or extension cords together. As can be seen the power cord clip of the present invention can be used to hold electric cords in close proximity to each other and prevent them from moving and therefore becoming tangled and susceptible to damage. The plug end of an extension or power cord 36 is placed in the closed end 26 and another section of the same cord or another cord 38 is inserted into the open end 28 of the power cord clip.

The present invention is molded by methods known in the art from plastics or polymers that give the cord clip of the present invention structural integrity while at the same time, flexibility for the lever to act as a hinge and open the opening of the open sleeve to accept the power or extension cord. One such plastic is polypropylene.

Other embodiments and variations to the preferred embodiments described herein will be apparent to those skilled in the art and may be made without departing from the spirit and scope of the invention as defined in the above description.

What is claimed is:

1. A power cord clip comprising:
   a first member;
   a second member selectively attached to said first member;
   said first member having an actuating lever associated therewith;
   said first and second members defining a closed sleeve and an open sleeve when attached to one another, said closed sleeve adapted to be positioned on a cord so as to be attached thereto, and said open sleeve having an opening along its circumference, wherein said lever is selectively depressed by a user to widen said opening and allow a portion of said cord to be positioned and selectively secured in said open sleeve.

2. A power cord clip as recited in claim 1, further comprising at least one retaining member for aiding in the retention and positioning of the cord within said closed or open sleeve.

3. A power cord clip as recited in claim 2, wherein said at least one retaining member is a retention member integrally formed within said closed or open sleeve.

4. A power cord clip as recited in claim 1, wherein said open sleeve is selectively opened and closed by a user and said closed sleeve remains fixed about said cord.

5. A power cord clip as recited in claim 2, wherein said at least one retaining member is a plurality of ribs integrally formed within said closed or open sleeve.

6. A power cord clip as recited in claim 1, wherein a biasing member is provided in association with said lever to bias said lever to a first position wherein said opening is substantially closed.

7. A power cord clip as recited in claim 1, further comprising a tubular insert having an opening along its length which is selectively positioned within said sleeves.

8. A power cord clip as recited in claim 7, wherein said tubular insert further comprises at least one retention member for aiding positioning of a power cord within said insert.

9. A power cord clip as recited in claim 8, wherein said at least one retention member is integrally formed within said insert.

10. A power cord clip as recited in claim 1, wherein said second member includes a depression to facilitate grasping for operation of said actuating lever.

11. A power cord clip as recited in claim 8, wherein said at least one retention member is a plurality of ribs integrally formed within said insert.

12. A power cord clip as recited in claim 1, wherein said sleeves are offset relative to one another to provide mechanical advantage upon depression of said actuating lever.

13. A power cord clip comprising:
  a body member having an actuating lever associated therewith and including a closed sleeve and an open sleeve, said closed sleeve adapted to have a cord positioned therethrough and said open sleeve having an opening along its circumference, wherein said lever is depressed to widen said opening and allow a portion of a cord to be positioned and selectively secured in said open sleeve.

14. The power cord clip of claim 13, wherein said closed sleeve is not readily openable.

15. A power cord clip as recited in claim 13, wherein said sleeves are offset relative to one another to provide mechanical advantage upon depression of said actuating lever.

16. A power cord clip as recited in claim 13, further comprising at least one retaining member for aiding in the retention and positioning of the cord within said closed or open sleeve.

17. A power cord clip as recited in claim 13, further comprising a tubular insert having an opening along its length which is selectively positioned within said sleeves.

18. A power cord clip as recited in claim 13, wherein said closed sleeve allows selective positioning and retention of said clip on a portion of said power cord.

19. A power cord clip as recited in claim 13, wherein said body member includes a depression to facilitate grasping for operation of said actuating lever.

20. A power cord clip as recited in claim 13, wherein said body member is formed from at least two pieces which are attached together.

* * * * *